H. R. SHAFER.
RESILIENT WHEEL.
APPLICATION FILED OCT. 8, 1918.

1,343,986.

Patented June 22, 1920.
2 SHEETS—SHEET 1.

Inventor
Homer R. Shafer,
By
Attorneys

H. R. SHAFER.
RESILIENT WHEEL.
APPLICATION FILED OCT. 8, 1918.
1,343,986.
Patented June 22, 1920.
2 SHEETS—SHEET 2.
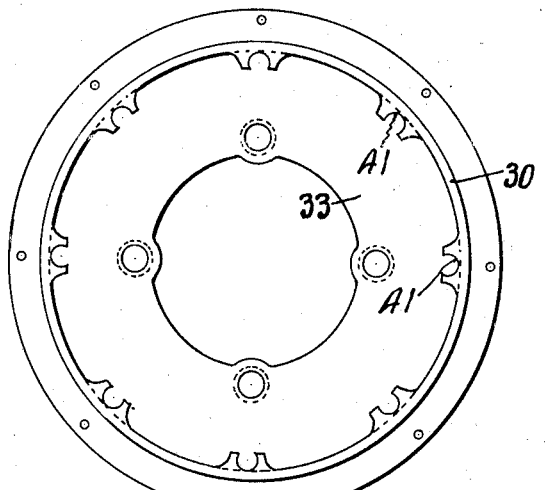
Fig. 3.
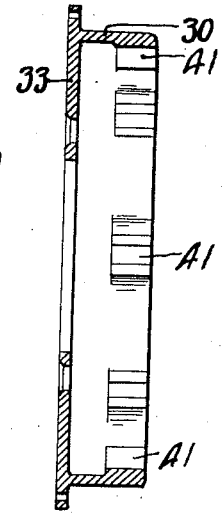
Fig. 4.
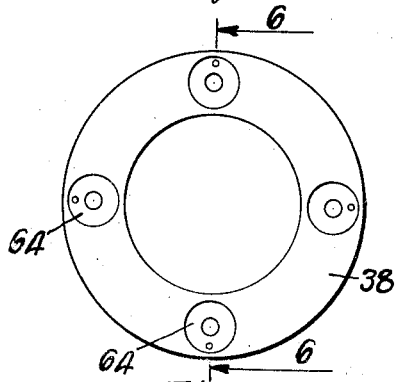
Fig. 5.
Fig. 6.
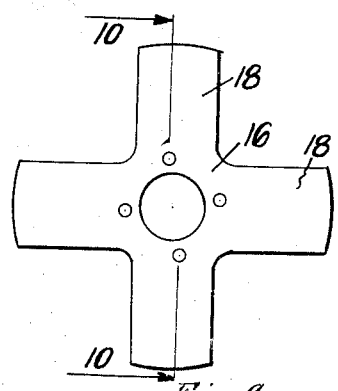
Fig. 9.
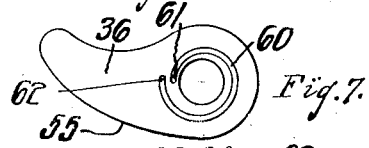
Fig. 7.
Fig. 10.
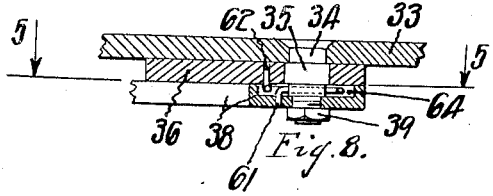
Fig. 8.
Inventor
Homer R. Shafer,
By
Pagelson D. Spencer
Attorneys

UNITED STATES PATENT OFFICE.

HOMER R. SHAFER, OF DETROIT, MICHIGAN.

RESILIENT WHEEL.

1,343,986.  Specification of Letters Patent.  Patented June 22, 1920.

Application filed October 8, 1918. Serial No. 257,328.

*To all whom it may concern:*

Be it known that I, HOMER R. SHAFER, a citizen of the United States, and residing at Detroit, in the county of Wayne and State of Michigan, have invented a new and Improved Resilient Wheel, of which the following is a specification.

The present invention relates to a resilient driving and carrying wheel for motor vehicles, the object being to provide a wheel of this nature whereby the weight of the vehicle is not only resiliently supported, but the torque or driving force applied to the wheel is also resiliently cushioned. Another object is to provide an effective positive or rigid driving connection when the wheel is turning forwardly and the resilient elements are fully compressed. Again, the invention also provides a positive or rigid driving connection when the wheel is turning backward; in the embodiment shown, this last named feature has associated therewith means whereby noise of contact of one part with another, as the direction of rotation of the driving axle is reversed, is prevented. The invention also provides a wheel of the type stated wherein an efficient lateral bracing is secured.

Figure 1:
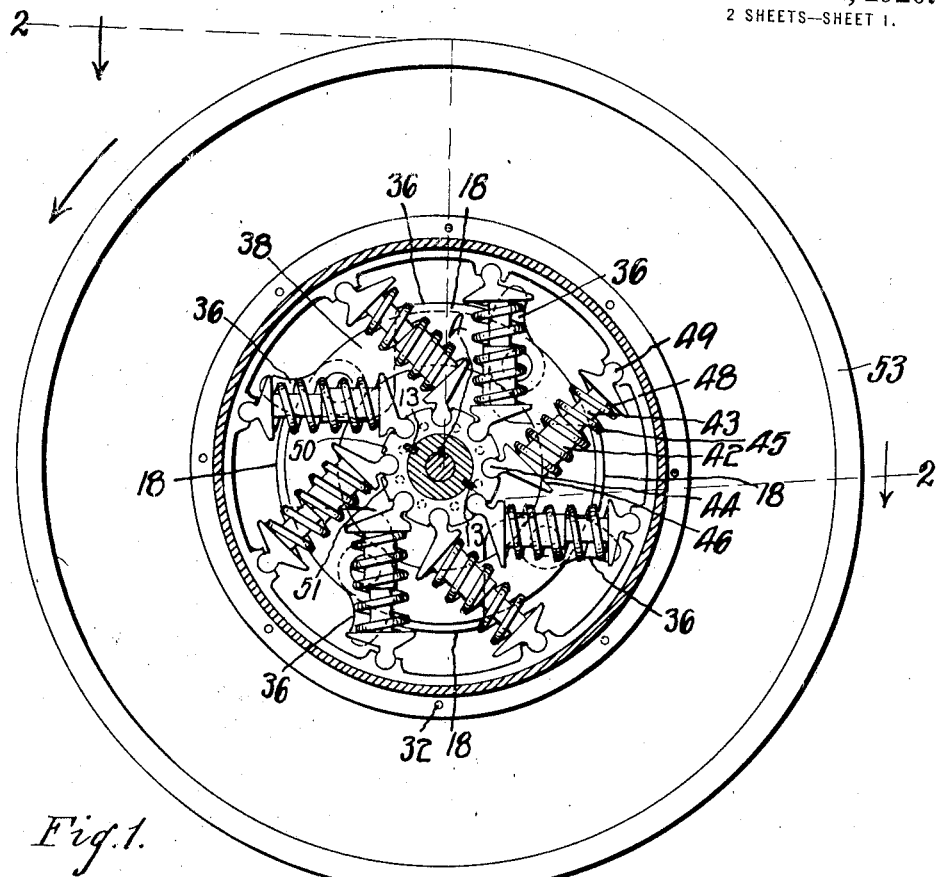
Figure 2:
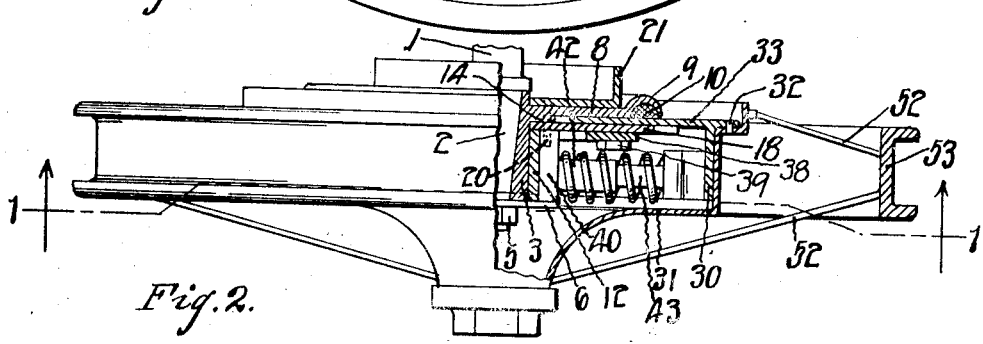

In the drawings, Figure 1 is a side view of enough of the driving wheel to show the preferred application of the invention thereto, the spokes which connect the outer hub member to the rim being omitted, and the outer portion of the wheel being removed substantially on the line 1—1 of Fig. 2. Fig. 2 is a view substantially on the line 2—2 of Fig. 1. Fig. 3 is a side elevation of the drum or inner element of the outer hub member. Fig. 4 is a transverse section thereof. Fig. 5 is a side elevation of the retaining member for the cam springs, the view being on the line 5—5 of Fig. 8. Fig. 6 is a section on the line 6—6 of Fig. 5. Fig. 7 is side elevation of one of the cams, the cam spring being in place thereon. Fig. 8 is a section through the bolt or stud whereon the cams are mounted, the relation of the various associated parts being shown. Fig. 9 is a side elevation of the cross through which power for driving rearwardly is transmitted from the inner hub member to the cams. Fig. 10 is a section on the line 10—10 of Fig. 9.

1 indicates the usual driving axle of an automobile or truck, this axle having the tapered end 2 on which a tubular inner hub member 3 is secured as by means of the key 4, the nut 5, and the collar 6. Integrally formed with the member 3 is a disk like flange 8 the marginal portion of which is recessed or grooved circumferentially at 9 to receive packing 10.

The member 3 is surrounded outside of the element 8 by an annular member 12 which is constrained to rotate therewith by means of keys 13, Fig. 1. Interposed between the inner member 12 and the adjoining shoulder 14 of the member 3 is a cross or auxiliary driving element 16, Fig. 9, having equally spaced arms 18, preferably four in number. This element is preferably formed from thin flat stock, and is secured to rotate with the element 3 by means of dowels or pins 20 that terminate at the outer surface of the brake drum 21, it being understood that the latter is rigidly connected to the flange or disk 8 by any suitable means, not shown. Thus the elements 3—8, 12 and 16 turn together, and they may be regarded as together forming a main driving drum or inner hub element. It will be observed that an annular circumferential slot is formed outside of the shoulder 14 between the cross and the flange 8.

Spaced from and surrounding the member 12 is a main driven drum or inner element 30 of an outer hub member the latter of which includes the pressed metal surrounding or housing element 31 to which the member 30 is connected, say by means of pins or rivets 32. The member 30 includes an annular inturned flange 33 the inner edge of which is normally spaced considerably from the outer edge of the shoulder 14. As best indicated in Fig. 8, the flange 33 supports a series (as shown, four) of studs 34 upon the enlarged middle portions 35 of which cams 36, hereinafter more fully described, are mounted; these cams are retained on the studs by means of the annular retainer 38 and nuts 39. The parts 30—31—34—36 therefore turn together in respect to the inner hub element, and also permit the latter to rise and fall a distance equal to the clearance of the flange 33 from the shoulder 14.

It will be seen that the member 12 is provided in its exterior surface with a series of seats 40 which extend parallel to the axis of the wheel, and that the member 30 is provided with a corresponding set of seats 41. Interposed between corresponding seats of the two series are resilient spokes which, in the embodiment shown, comprise the inner tubular members 42 into which the outer cylindrical elements 43, which may be hollow, are telescopically received. The heads 44 of the members 42 are shaped to fit the corresponding seats and are offset from the axis of the elements 42—43 as is shown in Fig. 1. Helical springs 45 surround the elements 42—43 and bear against shoulders 46—48 thereon and tend to force the parts of the corresponding spokes apart. It is evident that the heads 44 may rock in the seats 40 about lines parallel to the axis of the wheel and that the heads 49 of the elements 43 may have a like movement in respect to the seats 41. Both the seats 40 and 41 are preferably of greater than 180 degrees arc, whereby the heads are prevented from jumping out; and the seats 40 may also be flared at their entrances to form abutments 50—51, Fig. 1, so positioned as to act in a measure as limit stops for the angular movements of the spokes, although this action may be left entirely to the cross and cams as hereinafter described.

The forward movement of the wheel is in direction of the arrow which appears in Fig. 1; it is evident, therefore, that as the torque is transmitted from the inner hub member the resilient spokes will cushion the pulsations of the engine and the shocks encountered by the tire of the wheel and thereby insure a desirable power transmission and carrying action. It will be noted, see Fig. 1, that the forward edge of a given arm 18 of the cross is normally spaced considerably rearwardly from the rear edge or face of the next forward cam—this angular distance is great enough to permit the spokes to swing angularly in the seats sufficiently to develop the resiliency of the springs, after which the arms of the cross may come into engagement with the corresponding next forward cams to thereafter insure positive forward driving action. At this time the abutments 50 may engage the heads 44 if the parts are proportioned as heretofore stated, thus tending to form a second positive driving connection through the spokes. In any event, the resiliency of the springs tends to quickly reëstablish the angular regulation of parts shown in Fig. 1.

The parts being in the position shown in Fig. 1 and the driving axle being rotated backward, (clockwise), it is evident that the arms 18 will transmit driving force to the cams with which they are then in direct contact: this force, acting on the studs 35, is distributed through the web 33 and spokes 52, Fig. 2, to the rim 53.

Were no means provided to prevent it, the arms 18 would draw away from the cams when the axle is driven forward, and knocking might result when the movement of the axle were thereafter reversed. It is therefore desirable to provide some means for maintaining the front face 55 of the cams constantly in engagement with the rear faces of the preceding arms 18: one desirable embodiment of this means consists in the loop springs 60 one end of each of which is secured at 62 to the corresponding cam. By positioning the springs 60 in depressions 64 in the retainer 38, they are effectually protected and concealed.

It will be observed that the flange 33, being received between the ring 38 and the flange 8, serves, together with the spokes 42—43, to provide strong lateral support for the wheel.

The inner and outer hub elements form a chamber in which all relatively moving parts run in oil.

The various details of construction may be changed within considerable limits without departing from the spirit of the invention, for example, the number of arms 18 may be other than that shown; the embodiment shown is preferred because of its ease of manufacture and assembly and its general efficiency in supporting and driving the vehicle. I do not, therefore, wish to be limited except as indicated by the subjoined claims.

I claim:—

1. A resilient driving and carrying wheel comprising an inner hub element, an outer hub element, and a series of resilient driving and carrying spokes interposed between said elements and inclined forwardly from the corresponding radii of the wheel which pass through their inner ends, whereby torque for driving the outer hub element forwardly from the inner hub element is resiliently applied, said inner element including an arm, the outer element having members between which the arm is disposed said members being arranged to allow relative forward angular movement of the inner hub element in respect to the outer hub element to thereby develop the resiliency of the spokes, and one of the members being positioned to thereafter engage with the arm to establish positive driving connection between the hub elements.

2. A resilient wheel comprising an inner hub element having an annular flange and including a cross the arms of which are spaced a short distance from said flange, the outer hub member having an annular flange interposed between the first named flange and the arms of the cross and being free for relative movement transversely of the axis of the inner hub element, inclined resilient spokes interposed between the hub elements, and means independent of said spokes carried by the second mentioned flange for engaging the arms of the cross to form a positive connection for driving the outer hub element from the inner hub element.

3. A resilient wheel comprising two concentric hub elements one of which has an annular flange having spaced studs projecting therefrom, cams swingable on said studs, the other element including spaced arms overlapping said flange, each cam being arranged to engage one of the two adjacent arms when the inner hub element is rotated in one direction and a spring for maintaining the cam constantly in engagement with the other arm on one side thereof.

4. A resilient wheel comprising two concentric hub elements one of which includes a member having arms spaced about the axis of the wheel, the other element having an annular flange overlapping the arms on one face thereof, said flange being spaced from the inner element to allow relative movement transversely of the axis of the wheel, an annular retainer carried by the flange and overlapping the arms on the opposite side thereof, means connecting the retainer to the flange and coöperating with the arms to transmit torque from the inner element to the outer element, and resilient means for transmitting vertical loads from the inner hub element to the outer hub element.

5. As a means for transmitting driving stress from an inner hub element to an outer hub element of a resilient wheel, a pair of arms fixed to one of the elements and spaced apart angularly about the axis of the wheel, a projection on the other element between said arms, a cam rotatable on the projection, said cam being spaced from one of the arms when the wheel is normally turning in one direction, and means tending to turn the cam about the projection to maintain the cam constantly in engagement with the other arm regardless of the direction of rotation of the wheel.

6. A resilient wheel comprising inner and outer hub elements and a series of resilient spokes disposed tangentially to the inner hub element and connected at their ends to said hub structures, said inner hub element being formed with radial arms, an inwardly extending flange on the outer hub element, pins mounted thereon, cams independent of said spokes mounted on said pins in the same radial plane as the arms on the inner hub member, and springs to hold said cams constantly in engagement with said arms so that stresses may be transmitted between the hub elements.

7. A resilient wheel comprising inner and outer hub members having over-lapping portions consisting of radial arms and a flange cams pivoted on the flange in the plane of the arms, springs to hold the cams in constant engagement with the arms, and tangential springs to normally transmit stresses from one hub member to the other independently of said cams.

HOMER R. SHAFER.